United States Patent

Yagitani

[11] 3,857,073
[45] Dec. 24, 1974

[54] CAPACITOR WITH POLYPROPYLENE DIELECTRIC

[75] Inventor: Takayuki Yagitani, Hyogo, Japan

[73] Assignee: Shizuki Electrical Mfg., Co., Ltd., Nishinomiya, Hyogo, Japan

[22] Filed: Apr. 10, 1973

[21] Appl. No.: 349,838

[52] U.S. Cl. ............................... 317/258, 317/260
[51] Int. Cl. ............................................ H01g 3/195
[58] Field of Search .................... 317/261, 260, 258

[56] References Cited
UNITED STATES PATENTS

| 901,498 | 10/1908 | Thomson | 317/261 |
|---|---|---|---|
| 1,568,918 | 1/1926 | Pfiffner | 317/261 |
| 1,713,867 | 5/1929 | Dublier | 317/261 |
| 2,526,321 | 10/1950 | Beverly | 317/260 |
| 3,048,750 | 8/1962 | Netherwood et al. | 317/260 R |
| 3,363,156 | 1/1968 | Cox | 317/258 X |
| 3,522,498 | 8/1970 | Price | 317/260 X |

Primary Examiner—E. A. Goldberg
Attorney, Agent, or Firm—Wenderoth, Lind & Ponack

[57] ABSTRACT

A paper/polypropylene film composite dielectric capacitor having a dielectric arrangement, wherein one of a pair of electrode foils is narrower in width, with its both edges made recessed foil edges in relation to the other electrode and its both surfaces kept in contact with paper, thereby improving overvoltage endurance to a large extent.

2 Claims, 9 Drawing Figures

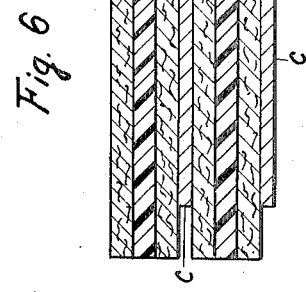
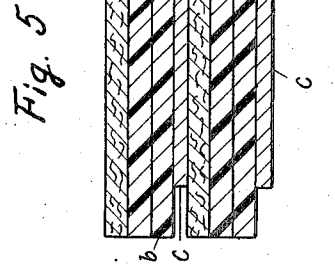
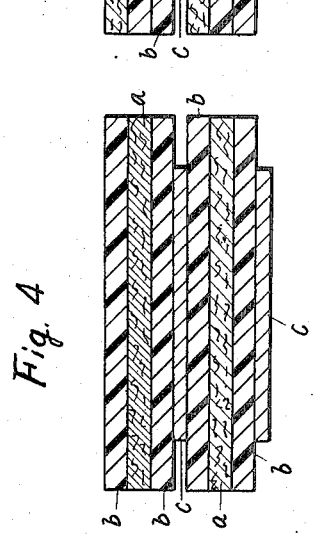
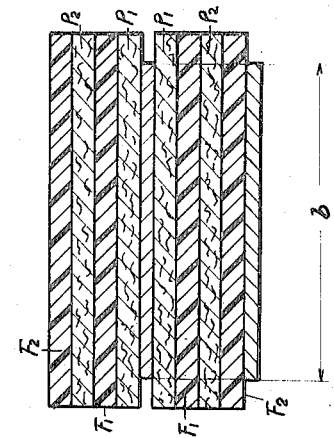
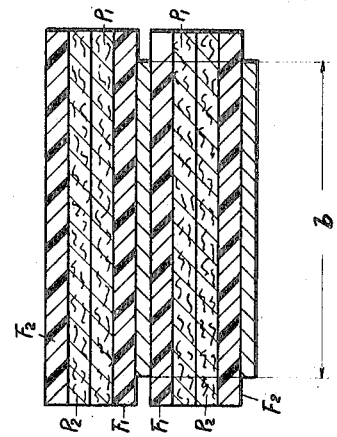
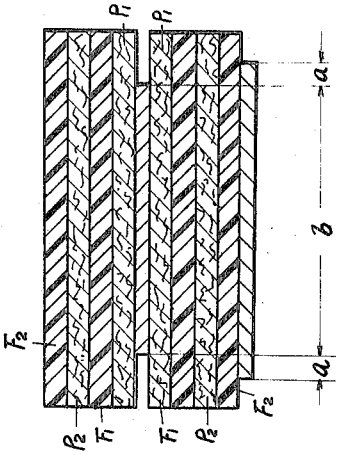

CAPACITOR WITH POLYPROPYLENE DIELECTRIC

BACKGROUND OF INVENTION

With regard to film/paper capacitors or composite dielectric capacitors of dielectric liquid impregnated paper and polypropylene film, investigations have been made into punctured capacitors in the field service, from which a peculiar failure character has been found. More particularly, most of the failure sites of film/paper capacitors are observed on the electrode foil edge. This fact suggests that a weak point of film/paper capacitor lies at the electrode foil edge where dielectric breakdown occurs due to overvoltage. In this connection, a life test has been carried out with model capacitors, by initially applying an overvoltage and then applying a constant AC voltage thereto. The result of this test has revealed that the failure character of model capacitors is quite similar to that observed in the field service, from which it has been proved that the failure of film/paper capacitors in the field service is ascribed to overvoltage.

With the above in view, the present invention has been made to provide the improved overvoltage endurance of electrode foil edge.

BRIEF DESCRIPTION OF THE DRAWINGS

FIGS. 4, 5 and 6 show three different types of dielectric arrangement for capacitor winding.

FIGS. 7, 8 and 9 show three different types of dielectric arrangement for capacitor winding.

DESCRIPTION OF THE INVENTION

Figure 1:
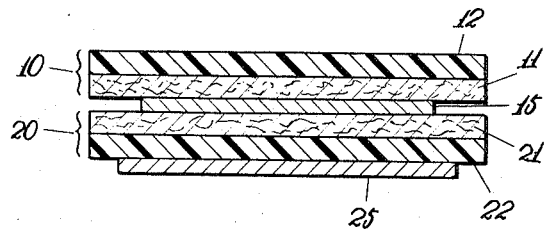
FIG. 1 shows a cross sectional view of one layer of a film/paper system capacitor winding in accordance with the present invention.

The conventional film/paper capacitor is generally formed of capacitor windings comprising two dielectric spacers and two electrode foils of the same width which are arranged in such a fashion that center lines to mandrel direction coincide with each other, as shown in Table 1 (FIG. 4).

Table 1

| Type | A | B | C |
|---|---|---|---|
| Dielectric arrangement Paper – a Film – b Foil – c | | See FIG. 4 | |

Type A in Table 1 is shown in FIG. 4 and is a typical dielectric spacer, in which paper is interposed between a pair of polyolefin film.

Type B is shown in FIG. 5 and is a modification of Type A, in which two sheets of polyolefin film in dielectric spacer are arranged adjacent each other.

As specimens of the capacitor winding made according to dielectric arrangement of FIG. 4, 20 film/paper capacitors have been made, using two sheets of polypropylene film of 12μ thickness and paper of 13μ thickness impregnated with trichlorodiphenyl. Of these 20 specimen capacitors, 10 first received a 3800V AC test voltage for one minute and were then tested for life under 1900V AC voltage at room temperature. The time leading to failure of each specimen has been plotted on a Weibull diagram, from which a mean time of 200 hours has been obtained. The remaining 10 specimens also received a 1900V AC voltage, but without the application of AC test voltage. However, none of these 10 specimens have been punctured even after a lapse of 8,000 hours.

Specimens which were punctured in this test have been disassembled for investigation, with the result that punctured (failure) sites have been observed along on the electrode foil edge without exception.

From the result of the above-mentioned life test, it is evident that the application of AC test voltage to specimens caused the shortened life of the film/paper capacitors. In order to investigate the effect of the application of test voltages on the life of capacitors, a specimen has been disassembled immediately after application of test voltage thereto and electrode foil edge has been examined by a magnifying glass.

In the capacitor winding as shown in Table 1 FIGS. 7, 8 and 9, electrode foil edges facing each other, with a dielectric spacer therebetween, can be arranged in alignment theoretically. However, even if a taking-up machine of high mechanical precision is used, it is inevitable that there exists a deviation of the foil edge alignment, much more than 0.2mm with the foil more than 100mm in width, between the two facing each other.

Investigation of the foil edges of the above specimen, using a magnifying glass, has revealed that at the position where the deviation is 0.1mm or more, so-called "tree-like tracking" has been observed, extending from the recessed foil edge to the position which corresponds to another electrode foil edge at the surface of polypropylene film in contact with the recessed foil. From this fact, it is evident that these specimens have failed due to a gradual increase of tracking which existed from the initial stage under the application of AC constant voltage. Such phenomenon is generally known as "back plate effect". It has been found by this experiment that the back plate effect begins to be appreciable if the length of deviation between electrode foils is about 3 or more times as long as the thickness of a dielectric spacer. It is also generally known that the overvoltage endurance of a film/paper dielectric liquid impregnated capacitor is improved by using dielectric liquid impregnated paper as a dielectric which makes contact with an electrode foil. This implies that when overvoltage was applied to a capacitor, tracking which is generated from the recessed foil edge by the back plate effect is suppressed by impregnated paper. In this sense, the dielectric arrangement of Type C shown in Table 1 (FIG. 6) is effective against overvoltage. However, under this dielectric arrangement, the ratio of resinous film to dielectric spacer is made smaller, which makes it impossible for the film/paper capacitor to display fully its original features, i.e. high dielectric strength and low power factor.

The present invention has been made by combining the two prior-known facts mentioned hereinbefore, namely, back plate effect and resistance of impregnated paper against tracking. More particularly, the electric capacitor in accordance with the present invention is a composite dielectric capacitor of dielectric liquid impregnated paper and polypropylene film characterized by its dielectric arrangement and electrode construction, in which one of two sheets of electrode foil which face each other is made narrower in width and its both edges are kept as recessed foil edges in relation to the other electrode, thus concentrating the surface tree upon the smaller width foil edge and suppressing the tracking generation by impregnated paper arranged at both surfaces of the smaller width foil to minimize the dielectric damage.

FIG. 1 shows a cross sectional view of one layer of a film/paper capacitor winding having the most basic dielectric arrangement and electrode construction in accordance with the present invention. Two electrode foils 15, 25, of which foil 15 is smaller in width, interspaced with two dielectric spacers 10, 20 which are composed of paper 11, 21 and polypropylene film 12, 22, are so arranged that both coincide with each other in the center line to mandrel direction. The smaller width foil 15 is interposed between the two sheets of paper 11 and 21.

Figure 2:
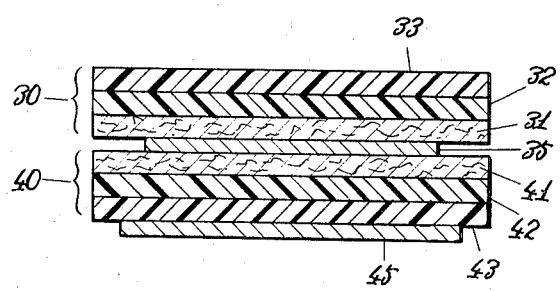
FIG. 2 shows a cross sectional view of one layer of another capacitor winding in accordance with the present invention.

FIG. 2 is an induced type of the film/paper capacitor winding shown in FIG. 1. In FIG. 2, polypropylene film 12 and polypropylene film 22 shown in FIG. 1, are replaced with two sheets of polypropylene film 32, 33 and 42, 43 respectively. Numerals 35 and 45 denote electrode foil. The smaller width foil 35 is interposed between paper 31 and paper 41. The capacitor of this type is intended for making film display its characteristics to the full extent by increasing a space factor of film in the dielectric spacer. In this type, it is easy to make a space factor of film greater than 65 percent.

Figure 3:
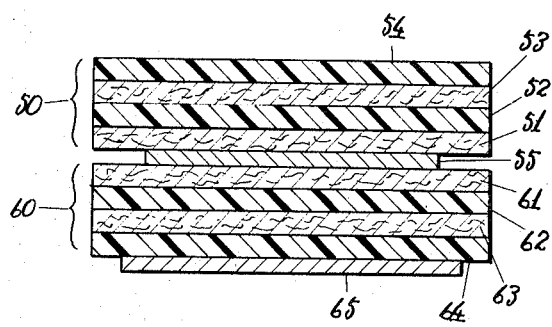
FIG. 3 shows a cross sectional view of still another capacitor winding in accordance with the present invention.

In the case of the dielectric arrangement wherein non-porous materials such as polypropylene are adjacent each other and film width exceeds 100mm, penetration of impregnant into film is found relatively difficult. The dielectric arrangement of dielectric spacers 50, 60 shown in FIG. 3 is intended for improving the penetration of impregnant. In FIG. 3, numeral 55 and 65 denote an electrode foil. With the smaller width foil 55 interposed therebetween, two sheets of paper 51, 53 and two sheets of polypropylene film 52, 54 are alternately arranged at the upper side, while two sheets of paper 61, 63 and two sheets of polypropylene film 62, 64 are arranged alternately at the lower side. In this type, film width up to 600mm is available for practical use.

EXAMPLE

In order to prove an effective improvement on overvoltage endurance of the film/paper dielectric liquid impregnated capacitor in accordance with the present invention, the following overvoltage endurance test has been carried out. specifications of specimens used in this test are shown in Table 2, FIGS. 7, 8 and 9.

Table 2

| Type | D | E | F |
|---|---|---|---|
| Electrode foil length (cm) | 600 | 600 | 600 |
| Foil width (mm) | 65/70 | 65/65 | 65/65 |
| Dielectric width (mm) | 100 | 100 | 100 |
| Dielectric arrangement Paper – P Film – F Foil | | 2.5mm – a 65mm – b | |
| Dielectric spacer | $P_1F_1P_2F_2$ 18/15/13/15 61 | $F_1P_1P_2F_2$ 15/18/13/15 61 | $P_1F_1P_2F_2$ 18/15/13/15 61 |
| Capacitance (MF) | 0.26 | 0.26 | 0.26 |
| Case dimension (mm) | 36×60×130″ | 30×60×130″ | 30×60×130″ |
| Number of specimens | 8 | 8 | 8 |

Type D shown in FIG. 7 is a capacitor according to the present invention and an example of the dielectric arrangement shown in FIG. 3.

Type E shown in FIG. 8 is an example of a conventional film/paper capacitor and is similar to Type A shown in Table 1.

Type F shown in FIG. 9 has the same dielectric arrangement as Type D but its electrode foils facing each other are of the same width. This type has been prepared in order to provide a direct comparison with the type according to the present invention in the effective improvement of overvoltage endurance.

In order to have these specimens compared easily with one another in the improvement effect of overvoltage endurance, all of the specimens have been designed the same with respect to the width of the dielectric spacer between electrodes and the space factor of film.

When power capacitors are switched in on the circuit, instantaneous overvoltage applied thereto can be analogized by the mode of voltage sequence as mentioned below.

The overvoltage sequence is composed of a 4 Khz damped oscillation voltage which is so regulated that the reversal rate is 80 percent and its value is stipulated at peak value ($V_1$) of the first wave, constant AC 2500V of 60 seconds application, and no stress duration of 10 seconds.

Such sequence of overvoltage has been continually applied to each specimen until failure. The number of shot to failure of each specimen has been plotted on a Weibull diagram and the mean value of shot times to failure ($\mu$) has been obtained, as given in Table 3. From Table 3, it is evident that the paper/film capacitor in accordance with the present invention has been improved in overvoltage endurance.

Table 3

| Type | D | E | F |
|---|---|---|---|
| $V_1$ (KV) | 13 | 12 | 13 |

Table 3-Continued

| Type | D | E | F |
|---|---|---|---|
| $\mu$ | 8600 | 2400 | 1400 |
| Failure rate of electrode foil edge | 5/8 | 8/8 | 8/8 |

Punctured specimens have been disassembled for investigation, with the result that all specimens of Type E and Type F have been punctured along on the electrode foil edge. As to Type D, five out of eight specimens have been punctured at the smaller width foil edge and the remaining three at the electrode foil surface. This fact indicates that in the film/paper capacitor in accordance with the present invention, dielectric strengths of foil edge and foil surface are in good harmony with each other.

What is claimed is:

1. In a dielectric liquid impregnated paper/polypropylene film composite wound foil type dielectric capacitor including a first electrode and a second electrode positioned in parallel with and opposite to said first electrode, said first electrode being narrower in width than said second electrode and said capacitor having interleaved layers of said paper and polypropylene film, the improvement comprising both sides of said first electrode being in contact with said paper and said second electrode being in contact with said polypropylene film, said electrodes being separated by at least one layer of interspaced film and paper.

2. The improved device of claim 1 wherein both sides of said second electrode contact said polypropylene film.

* * * * *